US011049135B2

(12) United States Patent
Handcock et al.

(10) Patent No.: US 11,049,135 B2
(45) Date of Patent: Jun. 29, 2021

(54) OFFERS SYSTEM

(71) Applicant: HERE GLOBAL B.V., Veldhoven (NL)

(72) Inventors: Jeremy Handcock, Seattle, WA (US);
Benjamin Goldfarb, Seattle, WA (US);
Damon Lanphear, Seattle, WA (US);
Rodrick Megraw, Seattle, WA (US);
Preethi Ramani, Seattle, WA (US);
Dan Yi, Seattle, WA (US); Curtis
Allred, Seattle, WA (US)

(73) Assignee: HERE Global B.V., Veldhoven (NL)

(*) Notice: Subject to any disclaimer, the term of this patent is extended or adjusted under 35 U.S.C. 154(b) by 1375 days.

(21) Appl. No.: 13/928,272

(22) Filed: Jun. 26, 2013

(65) Prior Publication Data
US 2014/0040025 A1 Feb. 6, 2014

Related U.S. Application Data

(60) Provisional application No. 61/664,743, filed on Jun. 26, 2012.

(51) Int. Cl.
G06Q 30/02 (2012.01)
G06Q 30/06 (2012.01)

(52) U.S. Cl.
CPC ..... *G06Q 30/0253* (2013.01); *G06Q 30/0617* (2013.01)

(58) Field of Classification Search
CPC ........... G06Q 30/0222; G06Q 30/0253; G06Q 30/0617
USPC ...................................................... 705/14.23
See application file for complete search history.

(56) References Cited

U.S. PATENT DOCUMENTS

| 5,794,207 | A | * | 8/1998 | Walker .................. G06Q 10/02 705/26.4 |
| 7,672,883 | B2 | | 3/2010 | Harford et al. |
| 2003/0217139 | A1 | * | 11/2003 | Burbeck ................. H04L 61/20 709/224 |
| 2005/0038893 | A1 | | 2/2005 | Graham |
| 2006/0085276 | A1 | | 4/2006 | Hoech et al. |

(Continued)

FOREIGN PATENT DOCUMENTS

| KR | 10-1082069 B1 | 11/2011 |
| KR | 10-1115073 B1 | 3/2012 |

OTHER PUBLICATIONS

Wiley Encyclopedia of Computer Science and Engineering (Year: 2009).*

(Continued)

*Primary Examiner* — Breffni Baggot
(74) *Attorney, Agent, or Firm* — Ditthavong, Steiner & Mlotkowski

(57) ABSTRACT

A computer system processes a message from a user mobile device by receiving the message from the user mobile device, wherein the message comprises a purchase request, and then determining a matching purchase offer in a database containing a plurality of purchase offers, wherein the matching purchase offer corresponds to an offer identified in the purchase request. The system then transmits a purchase request to a purchase agent at a third party provider that is associated with the matching purchase offer, and processing a purchase transaction received from the purchase agent at the third party provider.

20 Claims, 4 Drawing Sheets

(56) References Cited

U.S. PATENT DOCUMENTS

| | | | | |
|---|---|---|---|---|
| 2007/0129980 A1* | 6/2007 | Barros | G06Q 10/10 | 705/7.26 |
| 2007/0150334 A1 | 6/2007 | Bergh et al. | | |
| 2010/0057548 A1* | 3/2010 | Edwards | G06Q 30/02 | 705/14.13 |
| 2011/0047023 A1* | 2/2011 | Lieblang | G06Q 30/0207 | 705/14.36 |
| 2011/0208577 A1* | 8/2011 | Lieblang | G06Q 30/0239 | 705/14.39 |
| 2012/0029998 A1* | 2/2012 | Aversano | G06Q 30/00 | 705/14.27 |
| 2012/0101881 A1* | 4/2012 | Taylor | G06Q 30/02 | 705/14.13 |
| 2012/0259793 A1* | 10/2012 | Umansky | G06Q 10/06 | 705/348 |
| 2012/0290412 A1* | 11/2012 | Marovets | G06Q 30/02 | 705/14.73 |
| 2012/0316940 A1* | 12/2012 | Moshfeghi | G06Q 30/02 | 705/14.16 |
| 2013/0091002 A1* | 4/2013 | Christie | G06Q 30/02 | 705/14.26 |
| 2013/0185148 A1* | 7/2013 | Townsend | G06Q 30/0251 | 705/14.49 |
| 2013/0325567 A1* | 12/2013 | Bradley | G06Q 30/0207 | 705/14.1 |
| 2014/0278880 A1* | 9/2014 | Lemphers | G06Q 30/0239 | 705/14.26 |
| 2014/0278948 A1* | 9/2014 | Lemphers | G06Q 30/0273 | 705/14.49 |

OTHER PUBLICATIONS

Oracle, BPEL Designer and Service Engine User's guide (Mar. 2008)) (Year: 2008).*
International Search Report and Written Opinion dated Oct. 21, 2013 for International Application No. PCT/US2013/047997, 11 pages.
Notification Concerning Transmittal of International Preliminary Report on Patentability (Chapter I of the Patent Cooperation Treaty), ; International Preliminary Report on Patentability; Written Opinion of the International Searching Authority for corresponding International Application No. PCT/US2013/047997, dated Jan. 8, 2015, 8 pages.

* cited by examiner

OFFERS SYSTEM

CROSS-REFERENCE TO RELATED APPLICATIONS

This application claims priority of U.S. Provisional Patent Application Ser. No. 61/664,743 entitled "Offers System" by Jeremy Handcock, Benjamin Goldfarb, Damon Lanphear, Rodrick Megraw, Preethi Ramani, Dan Yi, Curtis Allred, filed Jun. 26, 2012. Priority of the filing date of Jun. 26, 2012 is hereby claimed, and the disclosure of the Provisional Patent Application is hereby incorporated by reference.

BACKGROUND

It is known to deliver commercial offers, such as discount offers or coupons, to mobile users. For example, Groupon, Inc. ("Groupon") provides an application that may be installed on mobile platforms such as tablet computers and smart telephones. In cooperation with merchants and affiliates, the Groupon application sends discount offers to subscribers of the application.

The merchants and affiliates develop offers and coupons with Groupon for sending to the Groupon subscribers. A subscriber provides Groupon with information such as geographic location, gender, and age, as well as email address. From this information, Groupon can determine which offers should be sent to the subscribed user according to a user's location, gender, and/or age. Further information is available over the Internet at the Web site of groupon.com. Other applications for mobile platforms may push offers and coupons to subscribers, including applications such as The Dealmap, ShopSavvy, Tipper, Living Social, Nextag, Deal Force, and the like.

The mobile applications provide links to commercial offers, which is a convenient means for users to be kept abreast of current opportunities for special purchases, but checking multiple sources of commercial offers can be inconvenient and cumbersome. Some services purport to aggregate multiple commercial offers from multiple sources, but typically redirect users to the various Websites of the respective vendors of the commercial offers.

Although such applications are convenient for pushing out offers and coupons to subscribers of their respective applications, greater flexibility and customization are desirable. The present invention addresses this need.

SUMMARY

Offers and coupons are accumulated and stored in a database for sending to registered users. Preferences are indicated by each user during the registration process and may be modified by the user afterwards. The offers and coupons to be pushed to users are determined in accordance with such self-reported preferences. For example, a user may prefer to receive offers that would otherwise be directed to persons not in the same geographic location, gender, or age group as the user. The offers and coupons may be accessed by third party network contacts. Thus, any application installed on a mobile platform that can access the database will be capable of pushing offers and coupons to registered users. Such in-application delivery increases the flexibility of delivering offers and coupons to a much wider audience. Such third party access may be achieved, for example, through an Application Program Interface (API). Other features and advantages of the present invention should be apparent from the following description of the preferred embodiments, which illustrate, by way of example, the principles of the invention.

DETAILED DESCRIPTION

Figure 1:
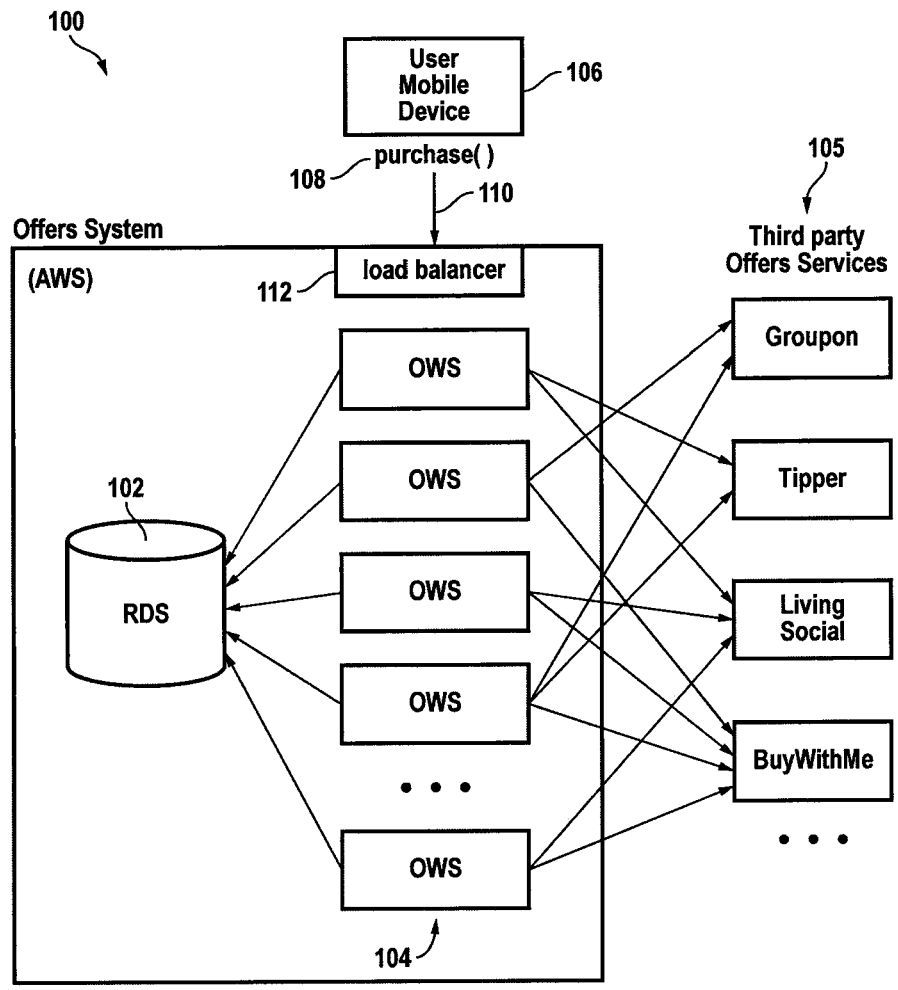
FIG. 1 is a block diagram of an offers system constructed in accordance with this disclosure.

FIG. 1 shows an offers system as disclosed herein. The offers system 100 includes a common database (RDS) 102 that is accessed by multiple Offers Web Service nodes (OWS) 104. The OWS nodes communicate with third party offers services. Several of the OWS nodes are identified with exemplary names such as Groupon, Tipper, Living Social, and BuyWithMe, for purposes of illustration only. These offers services sell the offer purchases that are bought by users, as described herein. The offers system 100 comprises a computer application that executes on a computer apparatus to manage data processing by the illustrated components of the system. Those skilled in the art will understand details of how an application may be executed on an operating system of a host computer apparatus. A purchase by a user is initiated by a user through a mobile device 106 that sends a purchase request that is identified as a "purchase( )" request 108, which is shown as being received at the offers system 100. The user purchase request 108 is sent over a mobile communications network 110 and may comprise a message or other communication that is generated by a browser or similar network application executing on the user's mobile device 106. Each of the respective OWS nodes 104 is responsible for placing the received purchase request 108 into a queue for processing and for executing a purchase in response to the purchase request. A "purchase order state" data record is stored in the database 102. As the purchase request is processed, the purchase order state may be checked periodically, and updated, by any one of the OWS nodes. Each of the OWS nodes has access to the database 102. The checking and updating of a purchase request need not be performed by the same OWS node that initiated the purchase request processing. The purchase request may be received at the offers system 100 by a load balancer 112 that functions as a network interface and will have knowledge of the processing workloads of the various OWS nodes 104, and will direct a received purchase request 108 in accordance with rules for balancing the workloads of the OWS nodes.

Figure 2:
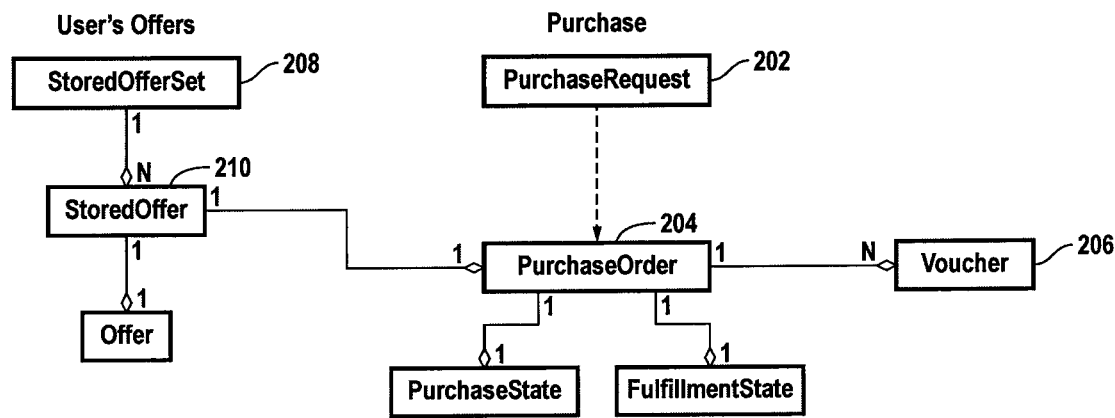
FIG. 2 is an object model of the classes implemented to perform a transaction using the offers system illustrated in FIG. 1.
Figure 3:
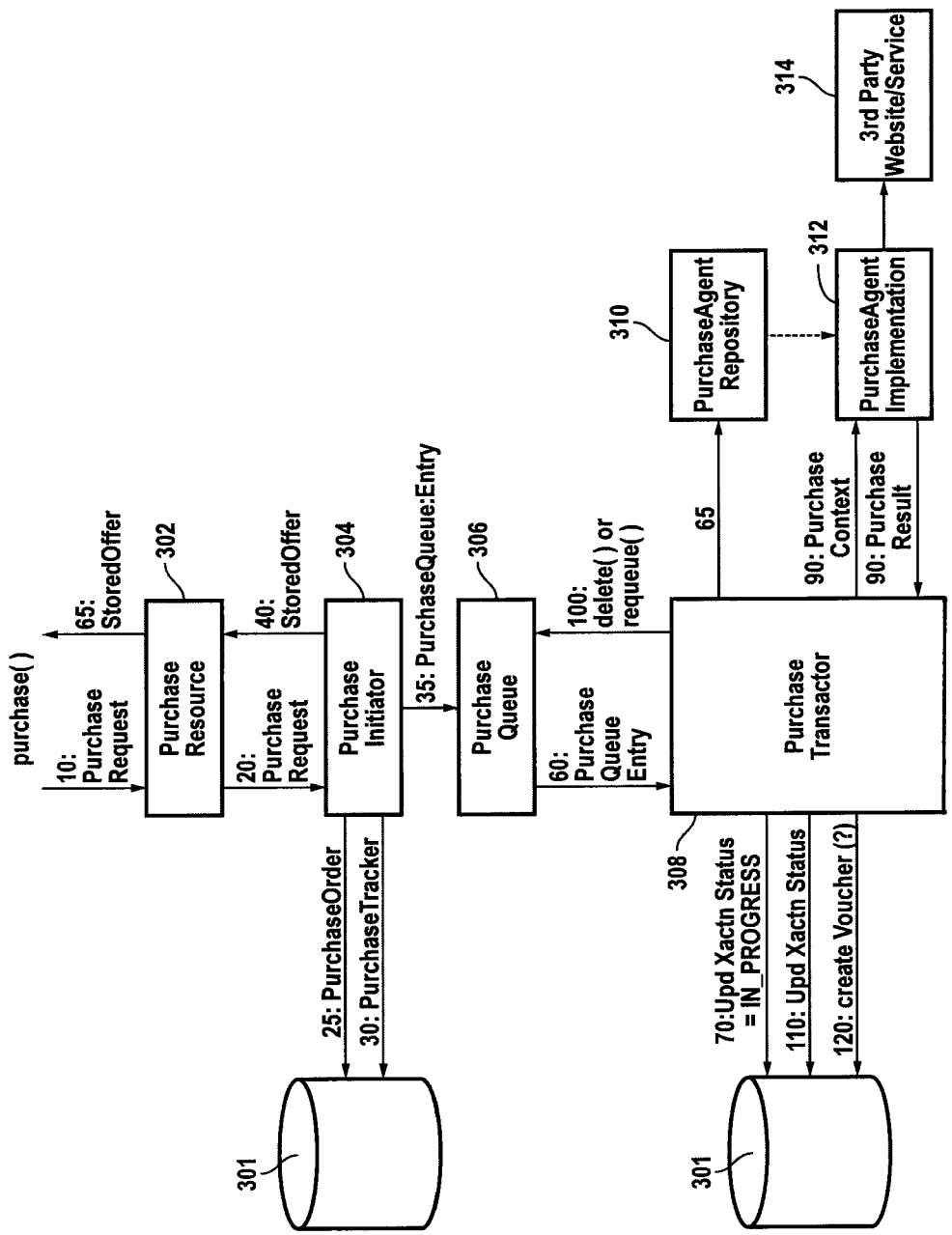
FIG. 3 is a flow diagram that shows the purchase process performed by the FIG. 1 system.

Processing of the offers system 100 (FIG. 1) will be described with reference to FIG. 2 and FIG. 3. FIG. 2 is a class diagram that shows the object classes of the offers system application 100 (FIG. 1) as implemented by the operating system of the offers system to perform a purchase transaction. FIG. 3 shows a combined block diagram and flow diagram that illustrates the purchase process performed by the FIG. 1 system.

The PurchaseRequest object class 202 refers to the purchase request 108 (FIG. 1) received from a user. A PurchaseAgent is an interface that the offers system uses to purchase an offer, as requested by a user. That is, a user who wants to utilize a "special offer" or other commercial offer of the system 100 must purchase the special offer to obtain the special circumstances. The PurchaseAgent Implementation 312 (FIG. 3) is the class of object that performs the purchase of the special offer. The PurchaseAgent Implementation also checks on the fulfillment status of an offer purchase. The PurchaseAgent Implementation interface defines common inputs and outputs for two operations that are used uniformly regardless of the offer provider.

The first operation is called "ExecutePurchase" and receives inputs comprising details on the offer being purchased, as well as user purchase card information, the item quantity for the offer purchase, and the user's account information at the remote provider (e.g., username, email address). The remote provider is typically a third party offers provider, such as the services 105 indicated in FIG. 1 and noted as a service 314 in FIG. 3. The ExecutePurchase operation is a method of the PurchaseAgent Implementation class 312 in FIG. 3. The output of the ExecutePurchase operation is the status of the purchase transaction. If the purchase transaction is unsuccessful (e.g, due to a credit card being declined), then a message such as user-friendly error information is provided.

The second operation of the PurchaseAgent is called "CheckFulfillment" and receives input comprising information to uniquely identify the user's offer purchase at the remote provider. The CheckFulfillment operation is a method of the PurchaseAgent Implementation class 312 in FIG. 3. The output of the CheckFulfillment operation is the status of the offer purchase fulfillment. If the purchase is successful, then the CheckFulfillment operation stores the voucher(s) issued by the offer provider so the user may redeem them in the mobile application via the API of the offers system. The user is notified in the mobile application that the offer is ready to be redeemed via the system's API. If the CheckFulfillment operation is unsuccessful, then a message such as a user-friendly error information is provided.

The offers system application also includes a PurchaseAgentSource class, which provides an interface for creating an instance of a PurchaseAgent for a specific offer provider. The PurchaseAgentSource receives input of an identifier for a specific offer provider (e.g., 'Tipp') and produces output of an instance of PurchaseAgent for the requested provider. A User Registration process provides a method to create a new user.

In FIG. 2, the PurchaseOrder 204 is an object that represents an order from a user to purchase an offer. The PurchaseOrder object contains information about the state of the purchase and fulfillment of the purchase, as well as a reference to the vouchers for this purchase. The Voucher object 206 is an object that can be used to redeem an offer. A voucher is issued by a third party remote offer provider and is stored in the offers database 102. The StoredOfferSet 208 is an object that represents a collection of purchased offers that forms a "wallet" of the user. The StoredOffer object 210 represents a single wallet entry, and contains a reference to the Offer that was purchased and contains a reference to the PurchaseOrder object. The Offer object contains metadata about an offer from a third party remote offer provider. Exemplary fields of the Offer object include offer title, price, description, redemption locations, expiration date, redemption instructions, and details on the merchant making the offer.

FIG. 3 shows a combined block diagram and flow diagram that illustrates the purchase process performed by the FIG. 1 offers system. All of the operations illustrated in FIG. 3 are performed at the offers system, comprising one or more computers performing the functions disclosed herein. The databases 301 indicated as being accessed by the Purchase Initiator 304 and Purchase Transactor 308 components can be located externally to the offers system computer, connected via computer networks. The process flows are numbered in FIG. 3 according to the order in which the respective processes are performed. Thus, a user's request to purchase an offer (indicated by the "purchase( )" method in FIG. 3) is received by the system's HTTP API at the process marked "10: Purchase Request" and the request 10 is eventually dispatched to the appropriate PurchaseAgent. The PurchaseAgent completes the purchase transaction and periodically checks the purchase fulfillment status at the 3rd-party offer provider 105 (FIG. 1). The state of the purchase and its fulfillment is maintained in the database 102 (FIG. 1).

After the receiving of the purchase request at 10 at the Purchase Resource 302, the next process occurs when the PurchaseResource 302 creates a PurchaseRequest data record at 20, calls the PurchaseInitiator 304 for a submitPurchaseOrder( ) method on the database to create a PurchaseOrder 25, and the PurchaseInitiator creates and persists a StoredOffer 40 containing a new PurchaseOrder and null Voucher. Next, the Purchase Initiator 304 creates and persists a PurchaseTracker object 30 with state=NEW and sets timestamps accordingly. The PurchaseInitiator creates a PurchaseQueue.Entry 35 using the PurchaseRequest 10 and a PurchaseTracker ID from the Purchase Initiator 304, placing an entry on a processing queue in the database. At the process 40, the StoredOffer containing the PurchaseOrder is generated by the Purchase Initiator 304 and is returned to the Purchase Resource 302. A PurchaseResource.purchase( ) method 55 of the Purchase Resource then returns the StoredOffer to the user. That process 55 concludes the acceptance and queuing process for the offer purchase request.

At processing for dispatching a purchase task, a PurchaseQueue component 306 retrieves a next purchase queue entry 60 from the database 102. If a queue entry exists, then the PurchaseQueue 306 creates a PurchaseTask 60 and submits it to a thread pool at the PurchaseTransactor 308. If there is no queue entry, then the PurchaseQueue enters an idle state in which it "sleeps" or otherwise halts request processing for a predetermined time. This processing is repeated until the purchase queue is empty.

Next, a PurchaseAgentRepository 310 requests processing by a PurchaseAgent from the PurchaseTransactor 308. The requested PurchaseAgent will have a provider-specific implementation. At the process 70, the PurchaseTracker state is updated to "IN_PROGRESS" and a corresponding timestamp is updated by the PurchaseTransactor 308. At the process 80, a PurchaseRequest is sent to a provider-specific Purchase Implementation 312, which may retrieve the appropriately configured PurchaseAgent from a third party Website service 314. At the process 90, a response is received from the purchaser (i.e., the user). The next processing performed will depend on the results of sending the purchase request. At the process 100, the entry is removed from the queue, to allow for a persistent queue with crash-safety plus retries of requests. At the process 110, the PurchaseTracker is updated with purchase data and the PurchaseOrder state is updated to SUCCESS or FAILURE, depending on the outcome of processing, and the fulfillment state is updated to PENDING. At the process 120, a FulfilimentTracker object is created with state set to PENDING if the purchase was successful. A voucher check period is also set, as well as a "next check time" for checking the PurchaseOrder status and a "give-up time" to limit the number of retries and provide a fail indication.

The purchase requests are received at the offers system (e.g., Medio Systems) from a mobile application. The database is maintained at Medio Systems. A user of the mobile application 106 initiates the action to purchase the offer within the application, which creates a purchase( ) request to Medio Systems. The PurchaseAgent Implementation 312 makes an off-site request to the third-party 314 to purchase the offer on behalf of the user (who initiated the action to purchase the offer within the mobile application).

Figure 4:
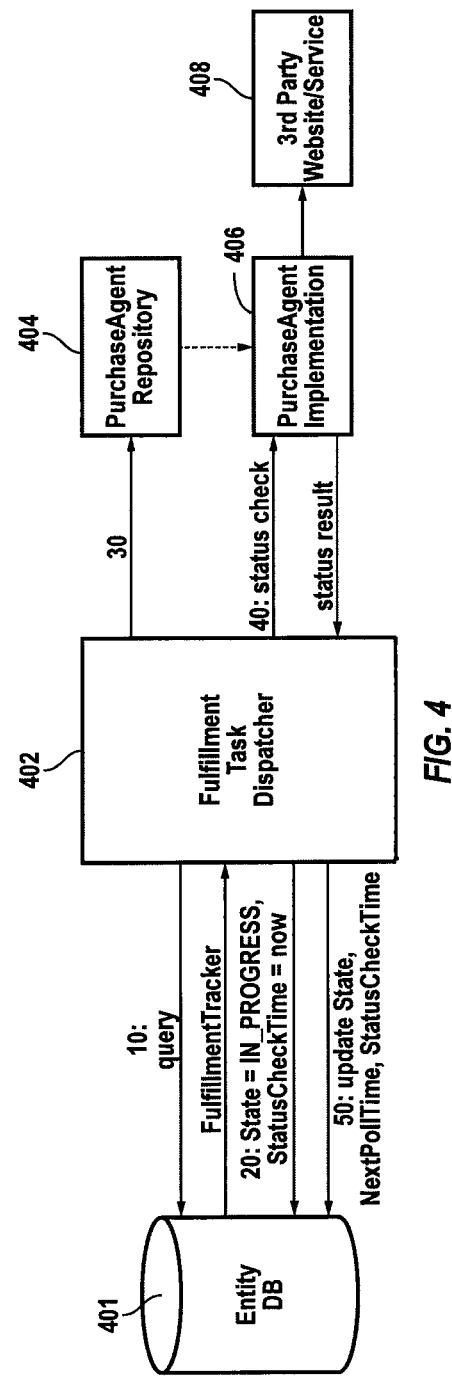
FIG. 4 is a flow diagram that shows the purchase fulfillment process performed by the FIG. 1 system.

FIG. 4 shows a combined block diagram and flow diagram that illustrates the purchase fulfillment (delivery) process performed by the FIG. 1 system. All of the operations illustrated in FIG. 4 are performed at the offers system, comprising one or more computers performing the functions disclosed herein. An entity database 401 is accessed by a Fulfillment Task Dispatcher component 402 and can be located externally to the offers system computer, connected via computer networks. The process flows are numbered in FIG. 4 according to the order in which the respective processes are performed. Thus, a query for a voucher is generated by the Fulfillment Task Dispatcher 402 at the process 10 in FIG. 4 and is stored in the database 401. For each transaction being processed, a voucher query will be generated so that a voucher in the database having a state that is "PENDING" will be selected. A limited number of pending vouchers may be retrieved, for example, one at a time.

A query for a voucher is performed in a Worker Task process created by the Fulfillment Task Dispatcher 402, and contains a reference to a PurchaseOrder object. The PurchaseOrder object contains all of the information needed to associate a voucher query with a purchase request from a user. If the Worker Task returns a voucher from the third party remote offer provider 408, the Fulfillment Task Dispatcher 402 will save the voucher information in a Voucher object. If a retrieved voucher matches a purchase request the FulfillmentTrackerState is updated to "IN_PROGRESS" and the StatusCheckTime value is set to the current time. If the remote offer provider 408 does not return a voucher (e.g., because the voucher has not yet been issued), then the Fulfillment Task Dispatcher 402 will stop its query operations and will go to a sleep state for a predetermined time before querying again.

For processing a Worker Task, the start of the offers system processing is indicated at 30, where a provider-specific implementation of a PurchaseAgent is retrieved from a Purchase Agent Repository 404 and is generated by a Purchase Agent Implementation 406. The voucher status is checked by a Third Party Web Site 408 at the process 40 to invoke a check.PurchaseFulfillment( ) method of the PurchaseAgent on the provider implementation. At the process 50, the state of the voucher in the database is updated by the Fulfillment Task Dispatcher 402. The state of the voucher will be set to READY is the voucher is ready for processing. The state will be set to PENDING if the voucher is not ready (i.e., a transaction error has occurred). The state will be set to ERROR if there has been a third party fulfillment error or it a predetermined time period for being in the PENDING state has lapsed. Processing then repeats for a next query.

All the illustrated operations are performed at the offers system (e.g., Medio Systems) using the "Entity" database. The PurchaseAgent Implementation 406 issues an off-site request to the third-party 408 to purchase the offer on behalf of the user. The Entity DB is at Medio Systems. The only part of FIG. 4 that occurs off-site is the request to the third-party 408 to purchase the offer on behalf of the user.

Figure 5:
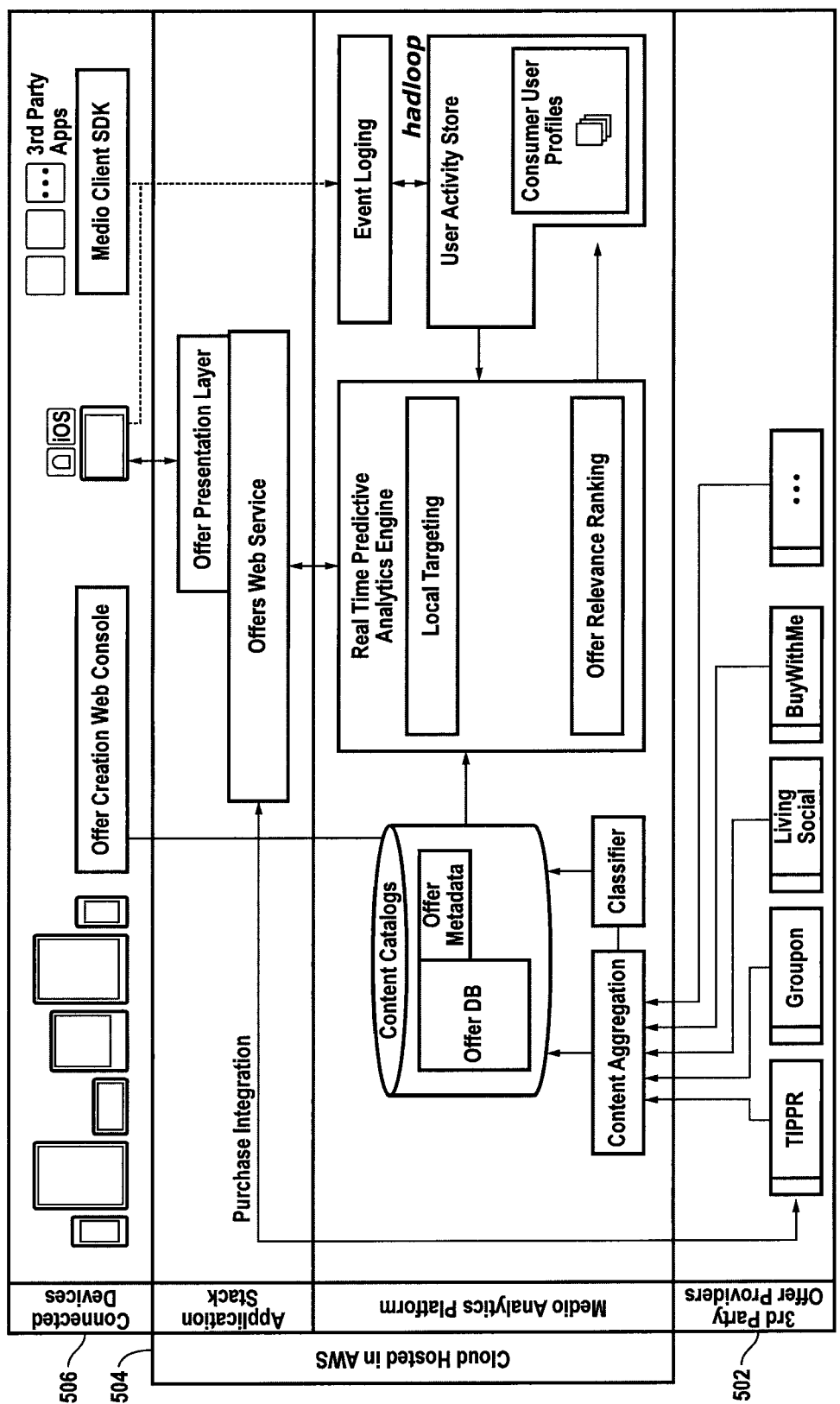
FIG. 5 is a block diagram that shows a data architectural overview of the offers system illustrated in FIG. 1.

FIG. 5 is a block diagram that shows a data architectural overview of the offers system illustrated in FIG. 1. The diagram shows the components of the system, and is similar to the depiction illustrated in FIG. 1. The system 500 shows third party offer providers 502 in which the PurchaseAgents and the Content Aggregator described above use the third party remote offer providers to collect information about the offers that are available and to execute purchases on those offers.

The Medio Analytics Platform 504 shows that a Classifier takes offers collected by a Content Aggregation component and automatically labels the offers with appropriate categories by examining text data in each offer, such as the title and description. These category labels are used by a Real Time Predictive Analytics Engine to match offers to users using an Offer Relevance Ranking component, which takes into account user category preferences. The Local/Location Targeting component ranks offers according to how far they may be redeemed from the user's current location. The Location Targeting component takes into account the fact that some categories of offers may be "location sensitive", meaning that the attractiveness or desirability of the offer may depend on user geographic location. For example, users may be willing to travel long distances to take advantage of a hotel offer, but they may only consider restaurant offers for a restaurant that is within a few miles from their current location. In this situation, offers geographically closer to the user are shown to the user before those that are further away. User activity events from the connected devices (e.g., clicks on offers, "Like" actions on offers, "buy" clicks on offers, purchases of offers, and the like) are provided to a User Activity Store to generate a User Profile for each user. The Real Time Predictive Analytics Engine uses the User Profile to determine what offers to show a given user and in what order to show the offers.

FIG. 5 shows an Application Stack that comprises the Offers Web Service that is described further above, as is the Purchase Integration system. The Application Stack includes an Offer Presentation Layer, which is the HTTP API that sits on top of the Offers Web Service, as described in further detail above.

FIG. 5 also shows Connected Devices, which may include any device that accesses the offers system via the API, as will be known to those skilled in the art from the description herein. The devices may include, for example, mobile devices that use an operating system such as "Android" by Google Inc., or the "iOS" client application by Apple Inc. The Offer Creation Web Console is described in further detail above. The Medio Client SDK is used to capture and log user activity events for processing and inclusion in the User Activity Store.

The Offers Distributed System described herein delivers commercial offers, which may be coupons or pre-paid discount opportunities, to software applications on mobile devices from multiple heterogeneous sources. The offers may come from one or more providers of offers that are external to the system itself. The offers are aggregate and grouped according to their applicability to individual end-users according to the preferences, both implicit and explicit, of the users. One or more applications on mobile devices place requests to the system for new offers, specifying the user's identity. The system uses the user's identity to lookup the user's preferences and then requests a set of offers that are appropriate for that user from the universe of available offers according to algorithmically determined criteria. The offers are then presented to the user within the application. Once presented, the user may signal their disposition to the offer by purchasing, ignoring, rating, or sharing the offer.

The system functions by integrating offers from two types of sources. The first is through an offer management system that allows business owners to create coupons of their own, along with a set of distinguishing properties such as store locations, target locations, discount amount, time limits, et al. The second is through a system of software agents that are configured to request the most recent offers from external offer providers. These offer providers have their own mechanisms for sourcing or creating offers. Once the offers are in the system that are also recorded for posterity and future analysis in a data storage mechanism designed to support batch processing of the offer data. The offers are also stored in a database that has been designed to support the targeting of offers to users according to user preferences.

Users register to the system. At registration time each user is given a unique identifier. The users are also asked to complete a survey that allows them to specify their preferences, age, location, and gender. This information is stored in a database that is designed to retain user information.

The system provides an Application Programming Interface (API) which is accessible via HTTP. This interface may be queried from any application in which offers may be embedded. The interface is designed specifically, however, for integration in mobile clients taking into account the need for efficient use of network bandwidth, the availability of the users' locations and other mobile-specific considerations when mobile applications communicate with the API.

A mobile client application has been designed and implemented that calls the API via HTTP to register the user and retrieve offers. The system selects offers that are most relevant for the user based on the user's location, interests, as well as attributes of the offer that determine the offer's popularity. The user is presented the offers in a format that supports the rapid viewing and inspection of the details of each offer. Offers may contain both text and images to describe the offer. Some offers may also be presented through rich media, such as video or audio.

Users are provided the ability to rate an offer, purchase an offer, or ignore an offer. Each of these actions are recorded and used in the analysis of user disposition to an offer which in turn will influence the relevancy ranking of offers returned to users on subsequent requests to the system. If the user elects to purchase or keep an offer then the system will conduct the purchase transaction on behalf of the user and store the offer in a "wallet" that is maintained on the server side of the system.

When the user is ready to use the offer at a point of sale the user the user can use the same mobile application to present a stored offer to the cashier. The use of the offer is likewise recorded by the system.

Finally, the system supports reporting on the performance and aggregate user disposition towards offers.

Problems Solved in the Present Invention Not Addressed in the Prior Art

The following features represent solutions to difficulties experienced with many conventional offers processing systems.

1. Automated collection of offers from multiple remote offer providers.
2. Long term storage of collected offers for use in analysis.
3. The ability to search and browse the collected offers based on multiple facets.
4. Automated classification of offers using unstructured text in the offer.
5. Targeting of offers to individuals based on configured preferences.
6. Storage and management of offers in a wallet managed by individual users.
7. The ability to integrate offers submitted to the system editorially alongside offers collected from remote providers.
8. The ability to target offers by location and differentiate between the current location and home location of the user.
9. Integration with mobile devices.
10. The ability to integrate offers via an Application Programming Interface (API) to any application.
11. Usage of an offer stored in a mobile wallet at a point of sale.
12. The ability to transact on the offer within the mobile application.
13. The ability to signal the disposition toward the offer, whether positive, negative or a rating to the service for use in future targeting.
14. The ability to target offers based on user disposition gathered from previous presentation of an offer.
15. The ability to report on and analyze the performance and user disposition toward offers.
16. The ability to classify arbitrary offers from 3rd parties into a common set of categories.
17. The ability to target offers based on user demographic attributes.
18. The ability to target offers based on user's current location and long-term location.
19. The ability to deliver different offers to different users for the purposes of multivariate testing
20. The ability to report results of multivariate tests in real time.
21. The ability to target offers based on collaborative filtering.
22. Location-driven targeting that takes into account the sensitivity of distance to redemption location by offer category.
23. Purchase transaction processing and fulfillment of offers from multiple remote providers.
24. Analytically-driven targeting that uses a combination of gender-based popularity, overall popularity, and velocity-based popularity.

This disclosure includes the attached appendix entitled "Offers Purchase Transaction Design", the contents of which are incorporated by reference.

We claim:

1. A method comprising:
   receiving, via a load balancer in a cloud associated with an offer system website, a first purchase request for a group discount offer from a mobile application associated with a first mobile device of a first user, wherein the group discount offer is set by an offering merchant to be executed when meeting a predetermined number of purchase requests, wherein the load balancer directs a received purchase request in accordance with rules for balancing workloads of a plurality of offer web service nodes in the cloud;
   processing the first purchase request, via a processor in the cloud, to generate and transmit at least one offsite request for the offer system website to a plurality of third-parties group discount offers platforms;

receiving, in response to the at least one offsite request, a plurality of group discount offers corresponding to the group discount offer via one or more of the plurality of offer web service nodes in the cloud communicating with a plurality of web services of the third-parties group discount offers platforms;

aggregating and storing the plurality of group discount offers in a common database for the offer system website;

ranking the plurality of group discount offers based on one or more preferences of the first user and one or more attributes of the group discount offer, wherein the one or more attributes include the predetermined number of purchase requests;

initiating, on a user interface of the first mobile device, a presentation of the group discount offer and one or more of the plurality of group discount offers based on the ranking within the offer system website; and fulfilling the group discount offer based, at least in part, on a first purchase transaction request and a corresponding predetermined number of purchase requests of other users without directing the first user, the other users, or a combination thereof to a website associated with the offering merchant, wherein the first purchase transaction request is based on a first user selection made on the presentation.

2. The method of claim 1, further comprising:
transmitting the first purchase transaction request to a purchase agent interface of an offering merchant associated with the first user selection; and processing an acknowledgement of a purchase transaction at the offering merchant associated with the first user selection to fulfill the first purchase transaction request, wherein the plurality of group discount offers are matched with the group discount offer based on a location of the first user, the one or more preferences of the first user, the one or more attributes of the group discount offer, or a combination thereof, and wherein the application implemented on the first mobile device and the common database are associated via a first user registration.

3. The method of claim 2, wherein transmitting the first purchase transaction request comprises transmitting a communication from the first mobile device to one of the offer web service nodes in the cloud.

4. The method of claim 1, further comprising:
generating a data record that indicates a purchase order state of the first purchase request;

setting the first purchase transaction request in a queue before meeting the corresponding predetermined number of purchase requests associated with the first user selection;

removing the first purchase transaction request from the queue after a predetermined time period, a purchase request retry number limit, or a combination thereof; and transmitting to an offering merchant associated with the first purchase transaction request a fail indication after the removing.

5. The method of claim 4, wherein the purchase order state is updated in the common database by one of the web service nodes, and wherein the queue is a persistent queue with crash-safety plus retries of purchase requests.

6. The method of claim 1, further comprising:
scanning respectively the plurality of group discount offers for content therein;

labeling the respective group discount offers with one or more category labels based, at least, on the content;

receiving a registration associated with the mobile application implemented on a second mobile device, wherein the registration is associated with a listing of user preferences associated with a second user of the second mobile device;

pushing at least one of the group discount offer and the plurality of group discount offers to the second mobile device based on the user preferences associated with the second user;

receiving a second user selection of a group discount offer associated with the first user selection, from the second mobile device, wherein the second user selection includes a second purchase transaction request of the group discount offer associated with the first user selection; and transmitting the second purchase transaction request to the offering merchant associated with the first user selection.

7. The method of claim 1, wherein the plurality of group discount offers in the common database are sorted using unstructured text of the respective group discount offers, and wherein the one or more attributes of the group discount offer include a gender-based popularity attribute, a velocity-based popularity attribute, or a combination thereof.

8. An apparatus comprising:
at least one processor; and
at least one memory including computer program code for one or more programs,
the at least one memory and the computer program code configured to, with the at least one processor, cause the apparatus to perform at least the following, receive, via a load balancer in a cloud associated with an offer system website, a first purchase request for a group discount offer from a mobile application associated with a first mobile device of a first user, wherein the group discount offer is set by an offering merchant to be executed when meeting a predetermined number of purchase requests, wherein the load balancer directs a received purchase request in accordance with rules for balancing workloads of a plurality of offer web service nodes in the cloud;

process the first purchase request, via a processor in the cloud, to generate and transmit at least one offsite request for the offer system website to a plurality of third-parties group discount offers platforms;

receive, in response to the at least one offsite request, a plurality of group discount offers corresponding to the group discount offer via one or more of the plurality of offer web service nodes in the cloud communicating with a plurality of web services of the third-parties group discount offers platforms;

aggregate and store the plurality of group discount offers in a common database for the offer system website;

rank the plurality of group discount offers based on one or more preferences of the first user and one or more attributes of the group discount offer, wherein the one or more attributes include the predetermined number of purchase requests;

initiate, on a user interface of the first mobile device, a presentation of the group discount offer and one or more of the plurality of group discount offers based on the ranking within the offer system website; and fulfill the group discount offer based, at least in part, on a first purchase transaction request and a corresponding predetermined number of purchase requests of other users without directing the first user, the other users, or a combination thereof to a website associated with the offering merchant, wherein the first purchase transaction request is based on a first user selection made on the presentation.

9. The apparatus of claim 8, wherein the apparatus is further caused to:
transmit the first purchase transaction request to a purchase agent interface of an offering merchant associated with the first user selection; and
process an acknowledgement of a purchase transaction at the offering merchant associated with the first user selection to fulfill the first purchase transaction request,
wherein the plurality of group discount offers are matched with the group discount offer based on a location of the first user, the one or more preferences of the first user, the one or more attributes of the group discount offer, or a combination thereof, and
wherein the application implemented on the first mobile device and the common database are associated via a first user registration.

10. The apparatus of claim 9, wherein transmitting the first purchase transaction request comprises transmitting a communication from the first mobile device to one of the offer web service nodes in the cloud.

11. The apparatus of claim 8, wherein the processor generates a data record that indicates a purchase order state of the first purchase request.

12. The apparatus of claim 11, wherein the purchase order state is updated by a web service node.

13. The apparatus of claim 8, wherein the apparatus is further caused to:
scan respectively the plurality of group discount offers for content therein;
label the respective group discount offers with one or more category labels based, at least, on the content;
receive a registration associated with the mobile application implemented on a second mobile device, wherein the registration is associated with a listing of user preferences associated with a second user of the second mobile device;
push at least one of the group discount offer and the plurality of group discount offers to the second mobile device based on the user preferences associated with the second user;
receive a second user selection of a group discount offer associated with the first user selection, from the second mobile device, wherein the second user selection includes a second purchase transaction request of the group discount offer associated with the first user selection; and
transmit the second purchase transaction request to the offering merchant associated with the first user selection.

14. The apparatus of claim 8, wherein the plurality of group discount offers in the common database are sorted using unstructured text of the respective group discount offers.

15. A non-transitory computer-readable storage medium carrying one or more sequences of one or more instructions which, when executed by one or more processors, cause an apparatus to at least perform the following steps:
receiving, via a load balancer in a cloud associated with an offer system website, a first purchase request for a group discount offer from a mobile application associated with a first mobile device of a first user, wherein the group discount offer is set by an offering merchant to be executed when meeting a predetermined number of purchase requests, wherein the load balancer directs a received purchase request in accordance with rules for balancing workloads of a plurality of offer web service nodes in the cloud;
processing the first purchase request, via a processor in the cloud, to generate and transmit at least one offsite request for the offer system website to a plurality of third-parties group discount offers platforms;
receiving, in response to the at least one offsite request, a plurality of group discount offers corresponding to the group discount offer via one or more of the plurality of offer web service nodes in the cloud communicating with a plurality of web services of the third-parties group discount offers platforms;
aggregating and storing the plurality of group discount offers in a common database for the offer system website;
ranking the plurality of group discount offers based on one or more preferences of the first user and one or more attributes of the group discount offer, wherein the one or more attributes include the predetermined number of purchase requests;
initiating, on a user interface of the first mobile device, a presentation of the group discount offer and one or more of the plurality of group discount offers based on the ranking within the offer system website; and
fulfilling the group discount offer based, at least in part, on a first purchase transaction request and a corresponding predetermined number of purchase requests of other users without directing the first user, the other users, or a combination thereof to a website associated with the offering merchant, wherein the first purchase transaction request is based on a first user selection made on the presentation.

16. The non-transitory computer readable storage medium of claim 15, wherein the apparatus is caused to further perform:
transmitting the first purchase transaction request to a purchase agent interface of an offering merchant associated with the first user selection; and
processing an acknowledgement of a purchase transaction at the offering merchant associated with the first user selection to fulfill the first purchase transaction request,
wherein the plurality of group discount offers are matched with the group discount offer based on a location of the first user, the one or more preferences of the first user, the one or more attributes of the group discount offer, or a combination thereof, and
wherein the application implemented on the first mobile device and the common database are associated via a first user registration.

17. The non-transitory computer readable storage medium of claim 16, wherein transmitting the first purchase transaction request comprises transmitting a communication from the first mobile device to one of the offer web service nodes in the cloud.

18. The non-transitory computer readable storage medium of claim 15, further comprising generating a data record that indicates a purchase order state of the first purchase request.

19. The non-transitory computer readable storage medium of claim 15, wherein the purchase order state is updated by a web service node.

20. The non-transitory computer readable storage medium of claim 15, wherein the apparatus is caused to further perform:
- scanning respectively the plurality of group discount offers for content therein;
- labeling the respective group discount offers with one or more category labels based, at least, on the content;
- receiving a registration associated with the mobile application implemented on a second mobile device, wherein the registration is associated with a listing of user preferences associated with a second user of the second mobile device;
- pushing at least one of the group discount offer and the plurality of group discount offers to the second mobile device based on the user preferences associated with the second user;
- receiving a second user selection of a group discount offer associated with the first user selection, from the second mobile device, wherein the second user selection includes a second purchase transaction request of the group discount offer associated with the first user selection; and
- transmitting the second purchase transaction request to the offering merchant associated with the first user selection.

* * * * *